(12) United States Patent
Binder et al.

(10) Patent No.: US 9,117,254 B2
(45) Date of Patent: Aug. 25, 2015

(54) SYSTEM, METHOD, AND COMPUTER PROGRAM PRODUCT FOR PERFORMING RAY TRACING

(71) Applicant: NVIDIA Corporation, Santa Clara, CA (US)

(72) Inventors: Nikolaus Binder, Berlin (DE); Carsten Alexander Wachter, Berlin (DE); Alexander Keller, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 73 days.

(21) Appl. No.: 13/685,630

(22) Filed: Nov. 26, 2012

(65) Prior Publication Data

US 2014/0028687 A1 Jan. 30, 2014

Related U.S. Application Data

(60) Provisional application No. 61/675,215, filed on Jul. 24, 2012.

(51) Int. Cl.
| | | |
|---|---|---|
| *G06T 15/00* | (2011.01) | |
| *G06T 1/00* | (2006.01) | |
| *G06T 15/06* | (2011.01) | |
| *G06F 12/08* | (2006.01) | |

(52) U.S. Cl.
CPC ............... *G06T 1/00* (2013.01); *G06T 15/005* (2013.01); *G06T 15/06* (2013.01); *G06F 12/0875* (2013.01); *G06F 2212/455* (2013.01)

(58) Field of Classification Search
CPC ......... G06T 1/00; G06T 15/005; G06T 15/06; G06F 12/0875
USPC ................................... 345/501, 419
See application file for complete search history.

(56) References Cited

U.S. PATENT DOCUMENTS

| | | | |
|---|---|---|---|
| 7,133,041 B2 * | 11/2006 | Kaufman et al. ............. 345/419 |
| 7,310,098 B2 | 12/2007 | Ohba | |
| 7,471,291 B2 * | 12/2008 | Kaufman et al. ............. 345/424 |
| 7,659,894 B2 * | 2/2010 | Keller et al. .................. 345/426 |
| 8,018,453 B2 * | 9/2011 | Fowler et al. ................. 345/419 |
| 8,234,234 B2 * | 7/2012 | Shearer .......................... 706/52 |
| 8,248,416 B2 * | 8/2012 | Keller et al. .................. 345/426 |
| 8,284,195 B2 * | 10/2012 | Brown et al. ................. 345/421 |
| 8,339,398 B2 * | 12/2012 | Shearer ......................... 345/426 |
| 2004/0066384 A1 | 4/2004 | Ohba | |
| 2008/0079731 A1 | 4/2008 | Shearer | |
| 2009/0225081 A1 | 9/2009 | Keller et al. | |

FOREIGN PATENT DOCUMENTS

TW 200405979 A 4/2004

OTHER PUBLICATIONS

Mora, B., "Naive Ray-Tracing: A Divide-And-Conquer Approach," ACM Transactions on Graphics, vol. 30, Oct. 2011, pp. 117:1-117:12.

(Continued)

*Primary Examiner* — Phu K Nguyen
(74) *Attorney, Agent, or Firm* — Zilka-Kotab, PC

(57) ABSTRACT

A system, method, and computer program product are provided for performing ray tracing. In use, ray tracing is performed utilizing a divide and conquer method, where the divide and conquer method is associated with a cache.

15 Claims, 3 Drawing Sheets

(56) References Cited

OTHER PUBLICATIONS

Fröhlich, B., "Ray Tracing mit Strahlenbündeln," 1993, pp. 1-121.
Áfra, A., "Incoherent Ray Tracing without Acceleration Structures," Eurographics, 2012, pp. 1-4.
Wächter, C. et al., "Terminating Spatial Hierarchies by a Priori Bounding Memory," 2007, pp. 1-6.
Eisemann, M. et al., "Geometry Presorting for Implicit Object Space Partitioning," Eurographics Symposium, vol. 31, 2012, pp. 1-11.
Bikker, J., "Improving Data Locality for Efficient In-Core Path Tracing," Computer Graphics Forum, 2012, pp. 1-12.
Karia, R., "Load Balancing of Parallel Volume Rendering with Scattered Decomposition," IEEE, 1994, pp. 252-258.
Ma, K-L. et al., "Parallel Volume Visualization On Workstations," Comput. & Graphics, vol. 17, No. 1, 1993, pp. 31-37.
Keller, A. et al., "Efficient ray tracing without auxiliary acceleration data structure," In Proc. of High Performance Graphics 2011, p. 1.
Office Action from Taiwan Patent Application No. 102126499, dated Dec. 5, 2014.
Examination Report from German Patent Application No. 10 2013 213 561.0, dated Jun. 21, 2014.

\* cited by examiner

SYSTEM, METHOD, AND COMPUTER PROGRAM PRODUCT FOR PERFORMING RAY TRACING

CLAIM OF PRIORITY

This application claims the benefit of U.S. Provisional Application No. 61/675,215, filed Jul. 24, 2012, the entire contents of which are incorporated herein by reference.

FIELD OF THE INVENTION

The present invention relates to graphics processing, and more particularly to performing ray tracing.

BACKGROUND

Image generation utilizing ray tracing has become an important area of computer graphics. For example, ray tracing may be used to produce synthetic images with a high degree of visual realism. However, current techniques for performing ray tracing have been associated with various limitations.

For example, current methods for performing ray tracing may be inefficient in that such methods may perform redundant actions during ray tracing computations. There is thus a need for addressing these and/or other issues associated with the prior art.

SUMMARY

A system, method, and computer program product are provided for performing ray tracing. In use, ray tracing is performed utilizing a divide and conquer method, where the divide and conquer method is associated with a cache.

DEFAME DESCRIPTION

Figure 1:
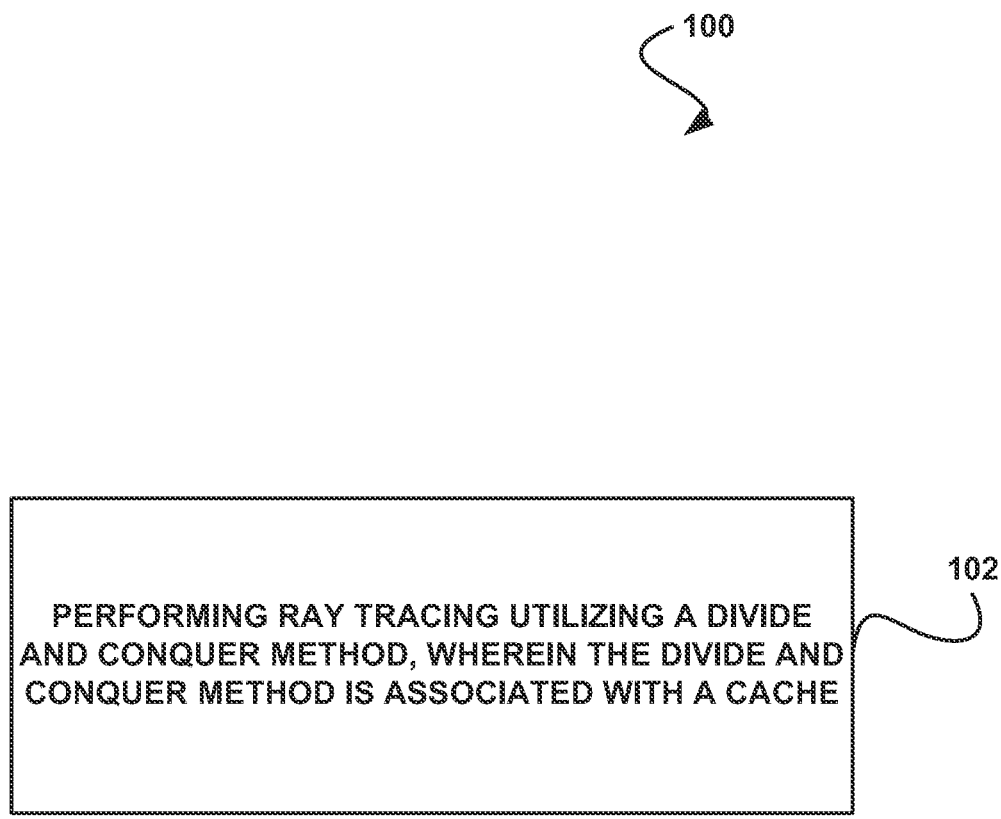
FIG. 1 shows a method for performing ray tracing, in accordance with one embodiment.

FIG. 1 shows a method 100 for performing ray tracing, in accordance with one embodiment. As shown in operation 102, ray tracing is performed utilizing a divide and conquer method, where the divide and conquer method is associated with a cache. In one embodiment, the ray tracing may include path tracing. For example, the ray tracing may include tracing a path (e.g., a light path, etc.) through a space (e.g., a scene, etc.), where the space includes one or more objects. In another embodiment, the ray tracing may include simulating one or more effects of encounters (e.g., intersections, etc.) of the path with one or more of the objects.

Additionally, in one embodiment, performing ray tracing utilizing the divide and conquer method may include performing partitioning. For example, performing ray tracing utilizing the divide and conquer method may include partitioning a space (e.g., the space in which the ray tracing is being performed, etc.). In another example, performing ray tracing utilizing the divide and conquer method may include partitioning an object list (e.g., a list of objects (e.g., geometric primitives, etc.) within the space, etc.).

Also, in one embodiment, the partitioning may be performed utilizing one or more methods. For example, the partitioning may be performed utilizing one or more of a surfaces area heuristic, a median split, a split by a global heuristic, and a split by a selected plane defined by an offset and a normal. In another embodiment, the partitioning may create a plurality of partitions (e.g., space partitions, object list partitions, etc.). In yet another embodiment, performing ray tracing utilizing the divide and conquer method may include culling one or more of the partitions (e.g., removing one or more of the partitions from a particular ray tracing operation).

Further, in one embodiment, performing ray tracing utilizing the divide and conquer method may include performing partitioning in a recursive manner. For example, performing ray tracing utilizing the divide and conquer method may include recursively subdividing the space, recursively partitioning objects within the space, etc. In another example, performing ray tracing utilizing the divide and conquer method may include tracing a selected number of rays through a selected number of objects by recursively partitioning one or more objects within a space to create one or more partitions of objects, and culling away the one or more partitions of objects from rays. In this way, an amount of intersection testing (e.g., testing of intersections between the ray and one or more objects, etc.) may be reduced (e.g., by performing hierarchical culling, etc.). In the same way, hierarchical culling may reduce the intersection testing by pruning a hierarchical traversal during recursively partitioning space.

Further still, in one embodiment, the cache may include one or more portions of memory within a computing system. For example, the cache may include one or more portions of memory located on a central processing unit (CPU) of the computing system, one or more portions of memory located on a graphics processing unit (GPU) of the computing system, etc.

Also, in one embodiment, information obtained during the ray tracing utilizing the divide and conquer method may be stored in the cache. For example, the cache may store partitioning information (e.g., partitioning results, etc.) associated with the divide and conquer method. In another example, a fixed amount of partition cache memory may be allocated, and such partition cache memory may store one or more of the plurality of partitions created by the partitioning during the divide and conquer method. In this way, partitioning results obtained as a result of performing ray tracing utilizing the divide and conquer method may be stored in the cache instead of storing a complete explicit hierarchical auxiliary acceleration data structure.

In addition, in one embodiment, information obtained during the ray tracing utilizing the divide and conquer method may be stored in the cache by modifying one or more portions of an algorithm associated with the divide and conquer method (e.g., a divide and conquer algorithm). In another embodiment, the cache may store a portion of a hierarchy associated with the performance of the ray tracing. For example, the cache may store one or more levels (e.g., a predetermined number of top levels, etc.) of a full hierarchy of partitions created by the partitioning.

Furthermore, in one embodiment, the cache may store one or more partitions based on recalculation times associated with the partitions. For example, each partition may be associated with a priority that is based on an amount of work required to perform a recalculation of that partition within the divide and conquer method. In another example, a predetermined number of partitions with the highest priority may be stored within the cache. In this way, the cache may store the partitions that are associated with the highest recalculation times.

Further still, in one embodiment, the ray tracing utilizing the divide and conquer method may be applied hierarchically. For example, the ray tracing may be performed utilizing a directed acyclic scene graph. In another embodiment, a plurality of caches may be associated with the multiple referenced nodes in the directed acyclic scene graph, such that each multiple referenced node in the directed acyclic scene graph has its own distinct cache.

Also, in one embodiment, the ray tracing utilizing the divide and conquer method may include hierarchical occlusion culling. For example, the divide and conquer method may be used for hierarchical occlusion culling during a rasterization. In another embodiment, a traversal order (e.g., an order in which a set of rays and a set of objects within the space are processed, etc.) may be determined in association with the ray tracing utilizing the divide and conquer method. For example, the traversal order may be determined by one or more of ray democracy, averaged ray directions, and quantized ray directions.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
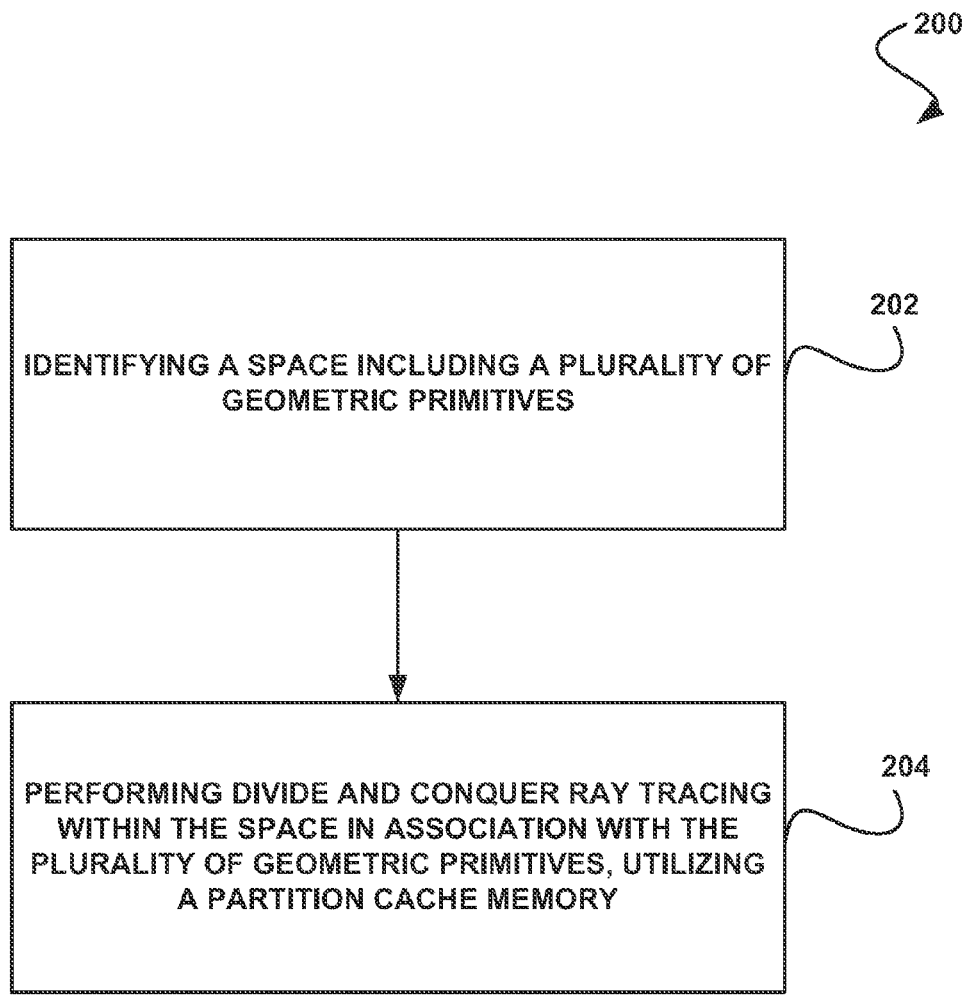
FIG. 2 shows a method for performing divide and conquer ray tracing, in accordance with another embodiment.

FIG. 2 shows a method 200 for performing divide and conquer ray tracing, in accordance with another embodiment. As an option, the method 200 may be carried out in the context of the functionality of FIG. 1. Of course, however, the method 200 may be implemented in any desired environment. It should also be noted that the aforementioned definitions may apply during the present description.

As shown in operation 202, a space including a plurality of geometric primitives is identified. In one embodiment, the space may include a scene to be rendered as an image by simulating a virtual camera. In another embodiment, the scene may include geometric primitives, which may include any object located within the space (e.g., geometric shapes, etc.).

Additionally, as shown in operation 204, divide and conquer ray tracing is performed within the space in association with the plurality of geometric primitives, utilizing a partition cache memory. In one embodiment, performing the divide and conquer ray tracing may include reordering a set of rays and a set of the geometric primitives utilizing a simultaneous hierarchical traversal while implicitly keeping track of the hierarchy. In another embodiment, the divide and conquer ray tracing may not store an acceleration data structure (e.g., such data structure may be implicit, etc.). See, for example, US Patent Application, US 2009/0225081 and "Efficient ray tracing without auxiliary acceleration data structure" (A. Keller et al., Poster, High Performance Graphics, 2011), which describe examples of divide and conquer ray tracing and are hereby incorporated by reference in their entirety.

Further, in one exemplary case of US Patent Application, US 2009/0225081 and "Efficient ray tracing without auxiliary acceleration data structure" (A. Keller et al., Poster, High Performance Graphics, 2011), performing the divide and conquer ray tracing may include performing spatial partitioning (e.g., recursive spatial partitioning, recursive subdivision, etc.). Also see, for example, "Naive ray-tracing: A divide-and-conquer approach" (B. Mora, ACM Trans. Graph., 30(5): 117:1-117:12, October 2011) and "Incoherent ray tracing without acceleration structures" (A. Áfra, EuroGraphics Short Paper, 2012), which describe exemplary implementations of spatial partitioning and are hereby incorporated by reference in their entirety.

Further still, in one embodiment, while divide and conquer ray tracing may be cache oblivious, benefits from cache performance may be obtained by reordering data. In another embodiment, redundant computation in the ray tracing may be addressed utilizing the partition cache memory. For example, a fixed amount of cache memory may be allocated to create the partition cache memory, and such partition cache memory may be used to cache information obtained during the performance of the divide and conquer ray tracing. For example, the partition cache memory may be used to cache information during the performance of recursive subdivision.

Additionally, see, for example, "Geometry presorting for implicit object space partitioning" (M. Eisemann et al., Computer Graphics Forum (Proc. of Eurographics Symposium on Rendering (EGSR)), 31(4), June 2012), "Ray Tracing Mit Strahlbündeln" (B. Fröhlich, PhD thesis, Naturwissenschaftliche Fakultät der Technischen Universität Carolo-Wilhelmina zu Braunschweig, 1993), "Improving data locality for efficient in-core path tracing" (J. Bikker, Computer Graphics Forum, Volume 31, Issue 6, pages 1936-1947, September 2012), and "Terminating spatial hierarchies by a priori bounding memory" (C. Wächter et al., In *Proceedings of the 2007 IEEE Symposium on Interactive Ray Tracing*, RT '07, pages 41-46, Washington, D.C., USA, 2007), which are hereby incorporated by reference in their entirety.

Also, in one embodiment, the partition cache memory may be implemented within one or more methods associated with the performance of the divide and conquer ray tracing. For example, the partition cache memory may be implemented by modifying a divide and conquer method. Table 1 illustrates an exemplary divide and conquer method that incorporates a partition cache memory. Of course, it should be noted that the method shown in Table 1 is set forth for illustrative purposes only, and thus should not be construed as limiting in any manner.

TABLE 1

```
intersect(start, end, active_rays, box, depth, node_id) {
    /// litter inactive rays and also store sum of active ray directions
    { active_rays, sum_dir } ← cull_rays(box, actve_rays);
    if (terminate(start, end, active_rays, depth))
        intersect_all(start, end, active_rays);
    else {
        if (is_in_cache(node_id, end – start)) {
            {mid, axis, left_box, right_box} ←
            get_from_cache(node_id);
        } else {
            axis ← get_axis(depth, box); // initially proposed axis
            {mid, axis, left_box, right_box}
                ← partition(start, end, active_rays, box, axis);
            insert_info_cache(node_id, {mid, axis, left_box,
            right_box}, end – start);
        }
        if (termination_cheaper(start, mid, end, box, left_box,
        right_box))
            intersect_all(start, end, active_rays);
        else {
            if (sum_dir(axis) > 0) {
                intersect(start, mid, active_rays,
                left_box, depth + 1, 2 * node_id+1);
                intersect(mid, end, active_rays, right_box,
                depth + 1, 2 * node_id+2);
            } else {
                intersect(mid, end, active_rays, right_box,
```

TABLE 1-continued

```
            depth + 1, 2*node_id+2);
            intersect(start, mid, active_rays, left_box,
            depth + 1, 2*node_id+1);
        }
    }
  }
}
```

In this way, an overall run time complexity of the divide and conquer method may remain the same, and a constant may be reduced (e.g., for data sets much larger than processor caches or main memory, etc.). In one embodiment, based on cache obliviousness and the partition cache memory, more costly partitioning heuristics may be amortized. Similar to precomputed acceleration structures, SAH criteria for the determination of split planes during partitioning may improve overall performance, but as opposed to precomputed structures, SAH evaluation may be performance critical during traversal and thus may be preferred only in partitions with a large amount of primitives and rays. See, for example, "Incoherent ray tracing without acceleration structures," (A. Áfra, EuroGraphics Short Paper, 2012), which is hereby incorporated by reference in its entirety. In another embodiment, if partitioning fails or the computational cost for termination is considered cheaper, recursion may be terminated after partitioning.

Additionally, in one embodiment, a top down cache strategy may be implemented in association with the partition cache memory. For example, based on the "node_id" in Table 1, data may be stored in the partition cache for "node_id<N." In this way, an upper part of an implicit tree used in the divide and conquer method may be cached in the partition cache memory. In another embodiment, all cache operations may be performed in constant time.

Table 2 illustrates an exemplary top down cache to store partitioning data for the top levels of an implicit hierarchy. Of course, it should be noted that the cache shown in Table 2 is set forth for illustrative purposes only, and thus should not be construed as limiting in any manner.

TABLE 2

```
insert_into_td_cache(key, value) {
    if (key < max_size) values(key) ← value;
}
is_in_td_cache(key) {
    return (key < max_size) ∧ (values(key) ≠ ∅);
}
get_from_td_cache(key, value) {
    return values(key);
}
```

Further, in one embodiment, a priority cache strategy may be implemented in association with the partition cache memory. For example, N elements with the highest priority may be stored in the partition cache, and priority may be based on an amount of work required for recalculation. In another example, insert operations may work on a priority queue and may be implemented as a van Emde Boas tree, which may be accomplished in $O(\log \log N)$. In another embodiment, lookups may be performed in $O(\log \log N)$ by an additional key hash map.

Further still, in one embodiment, small performance improvements that may cause unnecessary cache operations may be avoided if only elements with a priority greater by a factor k than the smallest currently stored priority are inserted. In another embodiment, a lower priority threshold for stored elements may be set. In yet another embodiment, the priority queue may be stored in reverse order (e.g., the top element in the queue is the element with the lowest priority, etc.).

Table 3 illustrates an exemplary top down cache to store partitioning data by its cost of computation. Of course, it should be noted that the cache shown in Table 3 is set forth for illustrative purposes only, and thus should not be construed as limiting in any manner.

TABLE 3

```
insert_into_priority_cache(key, value, priority) {
    if (priority ≥ min_priority) {
        if ((priority > k · priority_queue.top( ).priority) ∨
            (|values| < max_cache_size)) {
            if (|values| ≥ max_cache_size) {
                values(priority_queue.top( ).key) ← ∅;
                priority_queue.pop( );
            }
            values(key) ← value;
            priority_queue.push(priority, key);
        }
    }
}
is_in_priority_cache(key, priority) {
    return (priority ≥ priority_queue.top( ).priorty) ∧ (values(key) ≠ ∅);
}
get_from_priority_cache(key, value, priority) {
    return values(key);
}
```

Also, in one embodiment, with respect to instances and procedural geometry that is generated on demand, the divide and conquer ray tracing may be applied hierarchically. In another embodiment, in order to avoid further redundant partitioning, instances with common geometry may allocate their own common partition cache. In yet another embodiment, an LRU strategy may be applied to cope with the procedural generation of geometry (including recursive instancing, etc.). Upon eviction, evicted cache content may be stored on secondary storage. In still another embodiment, partition caches may be attached to any node of the traversal hierarchy. This application may be beneficial in cases where the total amount of geometry cannot be efficiently predicted (e.g., because it is procedural or includes instances, etc.).

Additionally, in one embodiment, the partition cache and its extensions may be applied in hierarchical occlusion culling. For example, a hierarchical traversal guided by the ensemble of rays implied by the raster structure of for example the screen or a shadow map, may increase the efficiency of rasterization by early-out testing with respect to z-buffering. This may emphasize that rasterization is a special case of divide-and-conquer ray tracing.

Further, in one embodiment, the ray tracing may include scheduling rays using the faces of voxels of an octree. See, for example, "Ray Tracing mit Strahlbündeln" (B. Fröhlich, PhD thesis, Naturwissenschaftliche Fakultät der Technischen Universität Carolo-Wilhelmina zu Braunschweig, 1993) or "Improving data locality for efficient in-core path tracing" (J. Bikker, Computer Graphics Forum, Volume 31, Issue 6, pages 1936-1947, September 2012), which are hereby incorporated by reference in its entirety. In another example, rays leaving the same face may be queued in same queues, which may increase processor cache efficiency by exploiting the coherence of rays with similar directions traversing similar locations in space. As opposed to precomputed auxiliary acceleration data structures, divide-and-conquer ray tracing may incorporate the current ray distribution by not partitioning space where rays and geometry do not intersect. In another embodiment, cache coherence can be increased by adapting traversal order according to ray directions.

For example, in divide-and-conquer ray tracing, one traversal order may be selected for a set of rays. Instead of deciding the order by the majority of signs of a selected component of the ray direction, which may be known as ray democracy, the sign of a selected component of the average direction of all active rays may be selected. This heuristic may improve the performance as compared to counting signs. In another example, rays also may be queued by the octant of their direction or the major axis and its sign. Then the number of queues may determine the maximum number of accesses to a voxel of the scene for one set of rays.

In this way, caching of data obtained during partitioning of primitive data may result in improved performance. Where such performance may increase with primitive data size and path length as data transfer is reduced. Furthermore, for smaller ray batches the performance gain may increase, as the method without caching may become less and less efficient and data may be sorted and recalculated all over again. Depending on the size of the cache, the performance of the cached variant may degrade to an acceptable degree, which may be important for longer paths and adaptive methods.

Additionally, the cached variant may benefit even more from reordering, as for large parts of the implicit hierarchy all required data may be retrieved from the first levels of a CPU cache. Compared to approaches that store the full acceleration structure, the hierarchical data may be built on demand and the amount of memory may be fixed. Partitions without any information in the partition cache may require re-processing of children bounding volumes and split indices; however, the amount of work may be minimized by the priority order. More importantly, for these partitions processor caches may be exploited efficiently due to the cache oblivious nature of the divide-and-conquer method.

Figure 3:
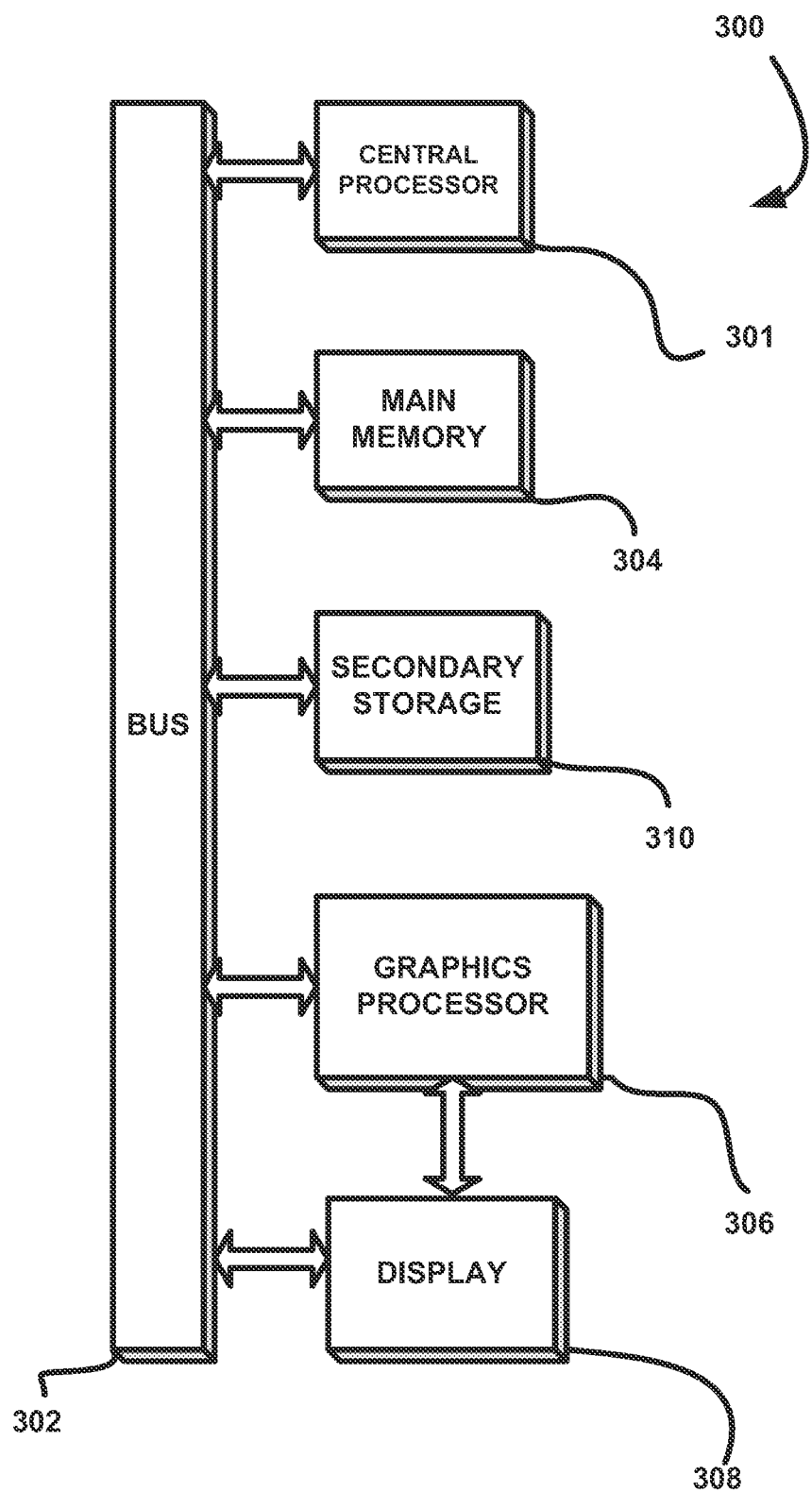
FIG. 3 illustrates an exemplary system in which the various architecture and/or functionality of the various previous embodiments may be implemented.

FIG. 3 illustrates an exemplary system 300 in which the various architecture and/or functionality of the various previous embodiments may be implemented. As shown, a system 300 is provided including at least one host processor 301 which is connected to a communication bus 302. The system 300 also includes a main memory 304. Control logic (software) and data are stored in the main memory 304 which may take the form of random access memory (RAM).

The system 300 also includes a graphics processor 306 and a display 308, i.e. a computer monitor. In one embodiment, the graphics processor 306 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. The system may also be realized by reconfigurable logic which may include (but is not restricted to) field programmable gate arrays (FPGAs).

The system 300 may also include a secondary storage 310. The secondary storage 310 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 304 and/or the secondary storage 310. Such computer programs, when executed, enable the system 300 to perform various functions. Memory 304, storage 310 and/or any other storage are possible examples of computer-readable media.

In one embodiment, the architecture and/or functionality of the various previous figures may be implemented in the context of the host processor 301, graphics processor 306, an integrated circuit (not shown) that is capable of at least a portion of the capabilities of both the host processor 301 and the graphics processor 306, a chipset a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 300 may take the form of a desktop computer, laptop computer, and/or any other type of logic. Still yet, the system 300 may take the form of various other devices m including, but not limited to a personal digital assistant (PDA) device, a mobile phone device, a television, etc.

Further, while not shown, the system 300 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method performed by a computer system, comprising:
    performing ray tracing, including:
        partitioning a space to create a plurality of partitions,
        for each of the plurality of partitions, associating the partition with a priority, based on an amount of processing required to recalculate the partition utilizing a divide and conquer method,
        storing a predetermined number of the plurality of partitions in a cache, based on the priority, and
        performing the ray tracing, utilizing the plurality of partitions.

2. The method of claim 1, wherein performing ray tracing utilizing the divide and conquer method includes partitioning an object list.

3. The method of claim 1, wherein the partitioning is performed utilizing one or more of a surfaces area heuristic, a median split, a split by a global heuristic, and a split by a selected plane defined by an offset and a normal.

4. The method of claim 1, wherein performing ray tracing utilizing the divide and conquer method includes culling one or more of the partitions.

5. The method of claim 1, wherein performing ray tracing utilizing the divide and conquer method includes performing partitioning in a recursive manner.

6. The method of claim 1, wherein performing ray tracing utilizing the divide and conquer method includes tracing a selected number of rays through a selected number of objects by recursively partitioning at least one of a space or an object list to create one or more partitions, and culling away the one or more partitions from rays.

7. The method of claim 1, wherein the cache stores one or more levels of a full hierarchy of partitions created by the partitioning.

8. The method of claim 1, wherein the cache stores one or more partitions based on recalculation times associated with the partitions.

9. The method of claim 1, wherein the ray tracing is performed utilizing a directed acyclic scene graph.

10. The method of claim 9, wherein a plurality of caches are associated with multiple referenced nodes in the directed acyclic scene graph, such that each multiple referenced node in the directed acyclic scene graph has its own distinct cache.

11. The method of claim 1, wherein the divide and conquer method is used for hierarchical occlusion culling during a rasterization.

12. The method of claim 1, wherein a traversal order is determined in association with the ray tracing utilizing the divide and conquer method, where the traversal order is determined by one or more of ray democracy, averaged ray directions, and quantized ray directions.

13. A computer program product embodied on a non-transitory computer readable medium, comprising code for:
   performing ray tracing, including:
      partitioning a space to create a plurality of partitions,
      for each of the plurality of partitions, associating the partition with a priority, based on an amount of processing required to recalculate the partition utilizing a divide and conquer method,
      storing a predetermined number of the plurality of partitions in a cache, based on the priority, and
      performing the ray tracing, utilizing the plurality of partitions.

14. A system, comprising:
a processor for:
performing ray tracing, including:
   partitioning a space to create a plurality of partitions,
   for each of the plurality of partitions, associating the partition with a priority, based on an amount of processing required to recalculate the partition utilizing a divide and conquer method,
   storing a predetermined number of the plurality of partitions in a cache, based on the priority, and
   performing the ray tracing, utilizing the plurality of partitions.

15. The system of claim 14, wherein the processor is coupled to memory via a bus.

* * * * *